Figure 1:
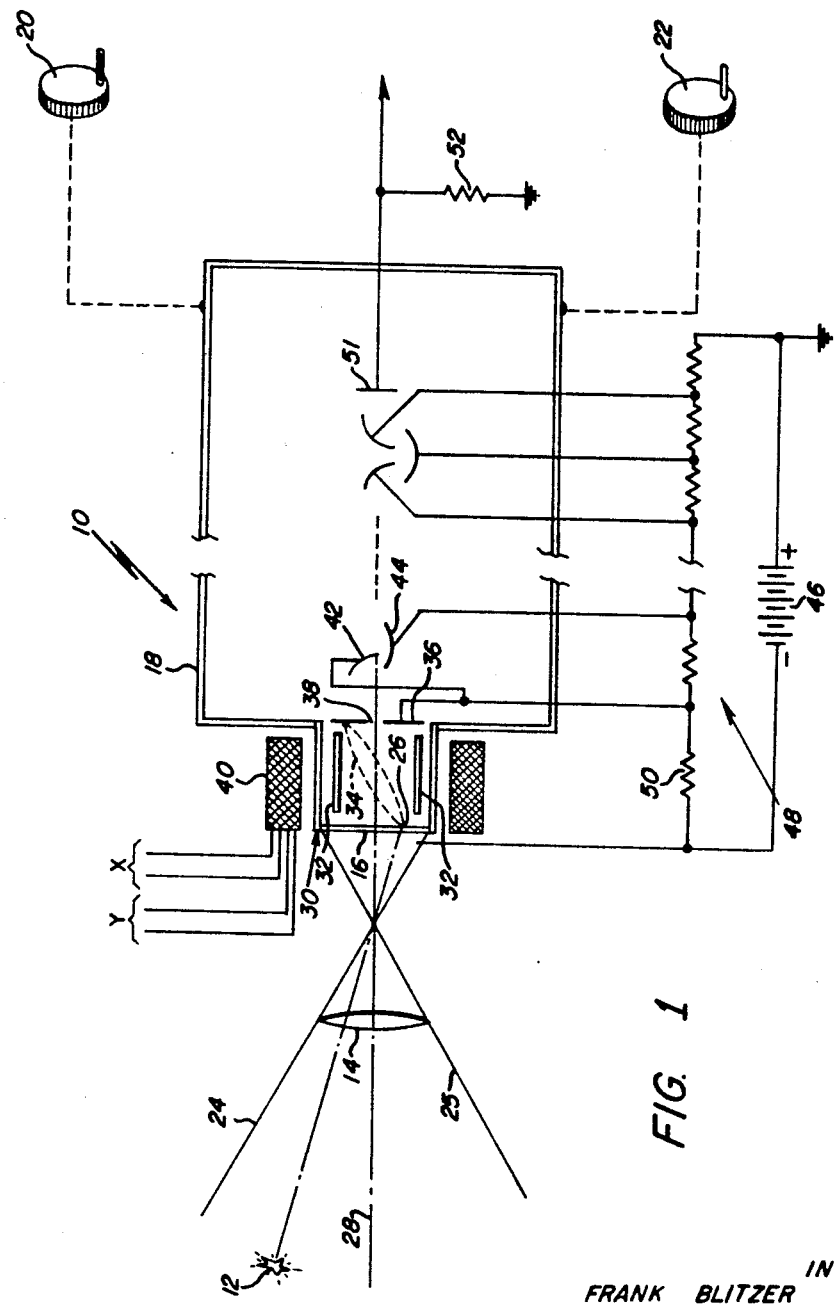

INVENTORS
FRANK BLITZER
HENRY D. ZUERNDORFER
CHAUNCEY P. DEWEY, JR

BY Herbert W. Arnold
ATTORNEY

United States Patent Office 3,320,423
Patented May 16, 1967

3,320,423
STELLAR DIRECTIONAL ACQUISITION SYSTEM USING PHOTOMULTIPLIER TUBE
Frank Blitzer, Framingham, Henry D. Zuerndorfer, Lexington, and Chauncey P. Dewey, Jr., Stow, Mass., assignors to Raytheon Company, Lexington, Mass., a corporation of Delaware
Filed Apr. 30, 1963, Ser. No. 276,801
7 Claims. (Cl. 250—203)

This invention relates to direction finding, and, more particularly, to a direction-finding system for providing directional indication of one or more radiant objects or sources of radiation, such as stars.

In the past, direction-responsive systems for signal reception have been provided, such as in television, wherein a trace is imposed on the face of a cathode ray indicator of the direction from which one or more signals originate. However, such signals are usually imposed on the face of said indicating device to provide an individual indication of the relative magnitude of incident illumination of one object with respect to an adjacent object, rather than to a determination of the angular position of one or more sources of light or radiation with respect to a reference axis of said indicating device. It would be extremely useful for applications, such as star tracking, as well as for the general application to the art of navigation, to provide in a single sensing device a sequential or simultaneous indication on the face of a single indicator or camera tube, the direction of individual sources of radiant energy with respect to a reference axis of said inciating device. For example, in navigating a vehicle along a desired course, it is desirable to establish the present position of the vehicle from a determination of two or more star line directions relative to a local vertical direction usually provided by a gyro or other instrumentation carried by the vehicle. In the past, when the direction of radiant energy sources, such as stars, are to be measured, it has been possible to measure only a single star line direction at one time, necessitating within a short time duration the subsequent training of the measuring device to the position of another star. This measurement operation necessitated moving relatively heavy equipment from one direction to another in a short period of time in order to achieve an acceptable accuracy of measurement.

It is, therefore, an object of the present inevntion to provide an improved radiant energy detection system; it is a further object to provide a measurement of one or more radiant energy or star line directions without the necessity of mechanical motion of the sensing device and to provide substantially simultaneous measurement of the directions of one or more star lines or radiant energy sources.

To achieve the measurement of a preselected star, the identity in magnitude and direction of the desired star is known prior to measurement. Thus, the data of individual stars, or the position and illumination magnitude of individual raidation objects is known and available for comparison with indications received by the measuring device. Such data is usually available for reference to aid in the determination of the position of a selected star so that the device is initially oriented in the general direction of the radiant energy source. Once such a position is known, present sensing equipment, which generally is provided with a relatively narrow field of view of a less than ten minutes of arc, must accurately be directed to point to the precise position of the desired object within the field of view, thus requiring accurate directional capability of the instrument.

It is, therefore, a further object of the invention to maintain a field of view as great as fifteen degrees in both azimuth and elevation, and to locate a particular star in that field to perform an accurate angular measurement with respect to an axis of the sensing device without the requirement of accurately prepositioning the sensing device. Alternately, it is desirable to search out an object of brightest magnitude within the field of view of the device in order to measure the location of such object or other adjacent objects which may be known to exist in such field.

In accordance with the invention, an image detecting device, such as an image dissector or an image photomultiplier, is used in connection with electronic scanning circuitry to measure with respect to a reference axis the position of a source of radiant energy impinging on a sensitive surface of said detecting device. In particular, a source of radiant energy, such as a star, is optically focused by a lens system so as to form a point image of radiant energy on the sensitive surface or photocathode face of the detecting device. The image is physically positioned on this surface at a point with respect to its reference axis which is related to the angular orientation of the radiant energy source relative to the reference axis. In other words, the displacement from the reference axis of the detecting device is a measure of the angular displacement of the source of radiant energy from that axis. Preferably, the optical axis of the lens system is aligned with the electrooptical axis of the detecting device. Based upon the electrical properties of the sensitive surface, light, or other types of radiant energy such as infrared energy, impinging upon said surface is by electron emission converted into an electron beam which is electronically focused in the detecting device by either electromagnetic or electrostatic means. This focusing action, inherent in such detecting device, produces an inverted image of the radiant energy source and is projected to an image plane or plate having an aperture located on, or in some fixed relation to, its electrooptical axis. The inverted image is focused an offset distance from the aperture corresponding to the displacement of the radiant energy on the sensitive material from this fixed axis as well as the radiant energy source from said fixed or reference axis. The beam which forms said image is then deflected through the centrally positioned aperture by an applied vertical and horizontal field and amplified by photomultiplier action in the detecting device to provide an output current proportional to the intensity of the radiating source. The value of the current required to deflect the beam through the aperture is proportional to the angular offset disance of the radiating source from the elecrooptical axis of the device.

To facilitate a coverage of the entire field of view of the sensitive detecting surface, a scan, such as a raster scan, is generated by horizontal and vertical deflection means of the detecting device so as to produce a scan such that electrons emitted from different small areas on the sensitive surface, corresponding to different radiant energy sources, pass through the terminate aperture when the deflection current is of a value corresponding to the offset distance of said radiant energy sources from the aperture. Since the sweep is related to displacement of the radiant energy source in time, by superimposing the image upon the sweep, a time comparison is made between the output current of the detecting device and the sweep current applied to the deflection means, and the time at which the two occur is simultaneously observed to provide an actual physical measurement of the time base to the center of the source of radiant energy.

Figure 2:
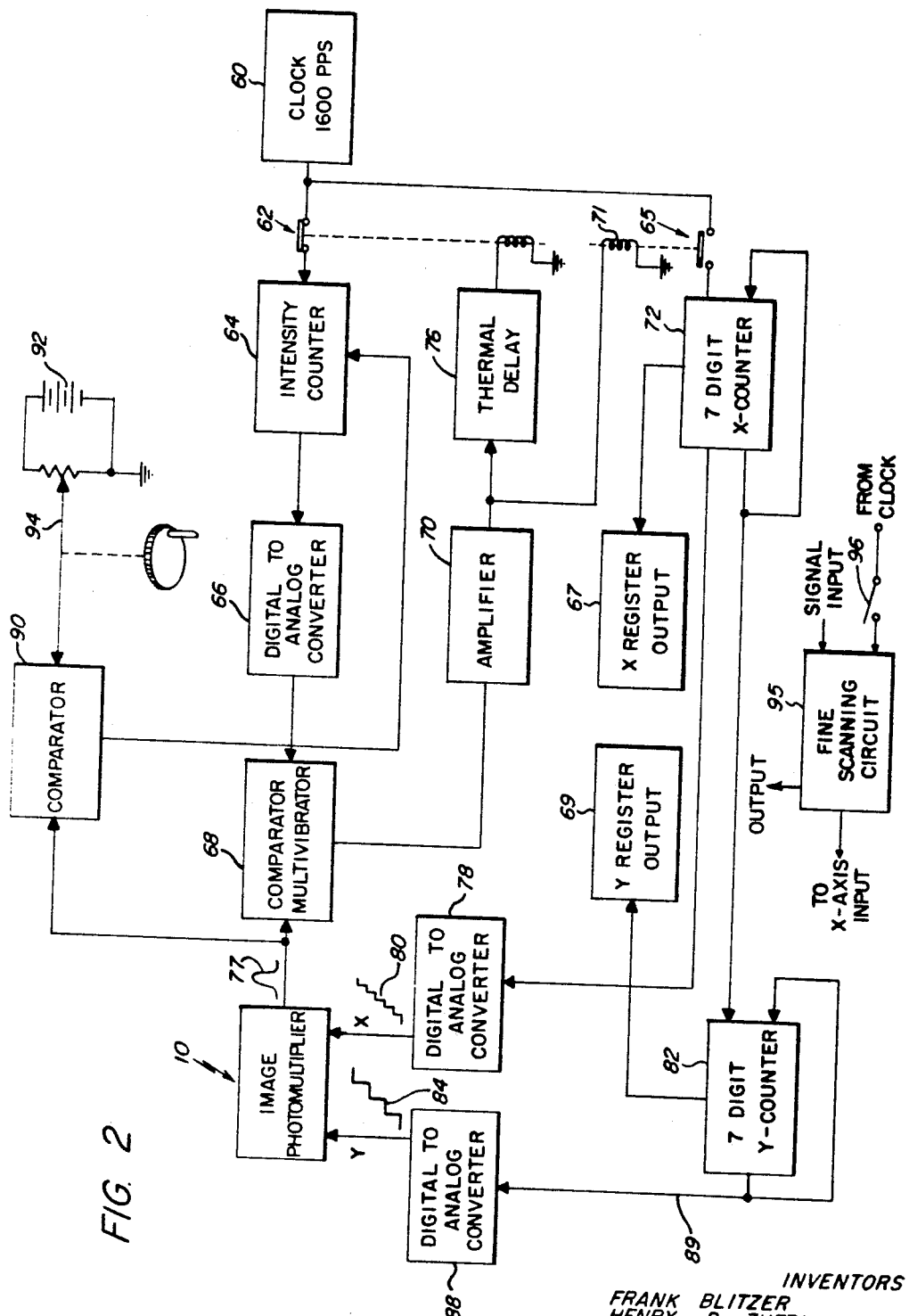

Other objects and features of this invention will be understood more clearly and fully from the following detailed description of the invention with reference to the accompanying drawings wherein:

FIG. 1 is a diagrammatic representation of an embodiment of the invention of an image photomultiplier tube as a detecting device; and FIG. 2 is a schematic diagram of the circuitry for scanning the detecting device of FIG. 1.

Referring to FIG. 1, there is shown a detecting device 10 for detecting a source of radiant energy, such as a star 12, which is located in the field of view of the detecting device. The detecting device is positioned mechanically in an approximate manner so as to place the radiant energy source 12 in the field of view established by a lens 14, which is preferably a composite lens to provide accurate focusing of the star image on the photocathode, or sensitive surface 16 of, for example, a model FW-143 image photomultiplier 18, manufactured by International Telephone and Telegraph Company. Lens 14 is fixedly mounted with respect to the electrooptical axis of the detecting device 10.

The detecting device or assembly is gimballed in azimuth and elevation by a conventional telescopic gimballing arrangement, not shown, but represented diagrammatically by hand cranks 20 and 22. Thus, when the hand crank 20 is rotated, the detecting device is rotated about the azimuth axis and hand crank 22 rotates the device about its elevation axis. In this manner, the electrooptical reference axis is approximately positioned in the direction of a star or star group containing the star from which it is desired to obtain an accurate reference or azimuth fix. Thus, in conjunction with a particular star at the particular time and location of the detecting sequence, the known orientation of the given star line is compared to the accurate measurement made by the detecting device with respect to its internal reference axis, and thereby the reference of the detecting device is calibrated to this known source of radiant energy. This star line reference, which has been repeatedly measured over a number of years and available in conventional almanacs and references of astronomical data, is thereby used as the basis for obtaining improved performance and accuracy of navigation devices, such as gyrocompasses, which may be augmented by information from the detecting device. For example, a gyrocompass represents a navigation instrument which is always referenced to North and has short-term accuracy due to drift. Also, at high latitudes near the north or south poles this accuracy is significantly degraded. However, utilizing known star positions as measured by the detecting device of the invention, long-term stability of the gyrocompass is made possible and maintainence of such a reference axis is made feasible at practically any latitude. Thus, a particular star of known position, such as star 12, is selected and focused upon sensitive surface 16 at point 26 appearing in the field of view of the optical system defined by lines 24 and 25. This is the point on which radiation flux from star 12 impinges and which is accurately measured with respect to the reference axis 28 of the detecting device. By photoemissive action, light flux at point 26 causes an electron beam to be emitted therefrom in the image section 30 of the detecting device. An electrostatic focusing lens 32 in the image section of the photomultiplier focuses the electron beam 34 to provide an inverted image, by electron optics, on an image plane or target plate 36 having a centrally located aperture 38. A horizontal and vertical deflection yoke 40 comprises $x$ and $y$ deflection coils which are toroidally positioned around the image section 30 of detecting device 10 and produce a magnetic field in response to deflection currents which are applied as $x$ and $y$ inputs, respectively. These currents are of a magnitude sufficient to deflect the electron beam 34 through the defining aperture 38 in a manner to be described in connection with the scanning circuitry of FIG. 2. In general, the current required to deflect the electron beam through the aperture on both coarse and fine scan correspondingly represents the coarse and fine position determination of the source of star energy with respect to electrooptical axis 28, and thus the star's known position with respect to this reference axis.

Electrons diverted by an appropriate magnetic field through the defining aperture 38 impinge upon a first dynode 42 of the photomultiplier section of the detecting device 10. This impingement results in secondary electron emission which is directed toward a second dynode 44 and successive dynodes, resulting in amplification of the beam through the secondary emission process in well-known photomultiplier operation. Each dynode is energized by a more positive voltage from direct current source 46 by a voltage divider network 48. In the present instance, sixteen dynodes are provided in the detecting device. Voltage divider resistor 50 provides an eight-hundred-volt potential between photocathode 16 and target plate 36 for proper electrostatic focusing action. The anode 51 collects the resulting electron current which is developed across output resistor 52 to produce an electrical output voltage from the detecting device. This voltage has been greatly amplified by photomultiplier action. The magnitude of such voltage varies in response to the scanning of the electron beam from a star past the aperture 38, whenever the star appears in a fixed location in the field of view. When no light flux impinges the photocathode surface, no electron beam is generated by the detector device even though the scanning voltages are continuously applied. The device may be used to detect and locate a plurality of sources of radiant energy simultaneously appearing in the field of view.

Referring now to FIG. 2, there is shown a schematic diagram for generating the appropriate horizontal and vertical deflection voltages to scan the emitted electron beam through the aperture and obtain an accurate measurement of the position of the star in the field with respect to the reference axis 28. FIG. 2 illustrates apparatus for providing a coarse scan determination of the star image location. The description will be given with reference to the coarse scan which is adapted accurately to measure the reference angle to within, for example, one minute of arc, which forms the basis for extremely fine measurement of a fine scan, which may be added to the device to obtain a precision of, for example, approximately five to ten seconds of arc.

The coarse scan comprises a digital scanning system which is used in conjunction with the detecting device to provide a measure of the intensity of a star in the field of view. The star intensity is obtained by comparing the output of the detecting device with the output of an intensity counter, which generates a staircase voltage level which is used to turn off the scanning whenever this voltage level becomes equal to, or greater than, the output voltage of the detecting device. In addition, a voltage threshold level corresponding to the lowest intensity star anticipated for measurement in the field of view is manually inserted as a bias voltage into the intensity counter to prevent counting of intensity levels below a preset star intensity, usually available in almanacs. Thus, this level is manually set in the circuit in a manner to be described and prevents an intensity measurement of undesired low intensity stars below such level, thereby improving the detection of a known star of relatively moderate intensity.

To achieve the above measurements, a digital clock, such as a 1600-pulse-per-second stable tuning-fork oscillator 60, provides a series of pulses through a conventional normally closed relay 62 to an intensity counter 64, which, in this embodiment, is a conventional binary counter adapted to count the number of pulses issuing from the clock 60. The clock also feeds pulses through a relay 65 to a seven-digit $x$ axis counter 72, which subsequently energizes both $x$ and $y$ deflection circuitry of the image photomultiplier through a $y$-axis counter 82 and digital-to-analog converters 78 and 88. The counter 64 is a conventional seven-digit counter having seven separate output lines corresponding to the individual counts of the pulses fed into said counter. The digital count in these lines is fed to a conventional digital-to-analog converter 66 for the generation of a staircase voltage corresponding to the entered digital value. A digtal-to-analog converter, such as a voltage divider ladder circuit and which may be used for digital-to-analog converters 66, 78, and 88, is shown in "A Digital and Sampled Data Control System" by Julius T. Tou, page 399f, published by McGraw-Hill Book Company, Inc., 1959.

The output of the digital-to-analog converter 66 is an analog voltage which is applied to one input terminal of an amplitude comparator circiut 68, which can be a biased multivibrator adapted to provide an output whenever the amplitude of the input voltage from photomultiplier 10 exceeds the voltage from the digital-to-analog converter 66. When the voltage of a given star exceeds that of the converter 66, the output of the comparator 68 is amplified in a current amplifier 70, such as a cathode follower, and applied to coil 71 of relay 65, opening said relay and removing the input voltage from the clock 60 to the $x$ axis counter 72. In this manner, the intensity counter continues counting to make the output level from the digital-to-analog converter 66 equal to the output voltage from the image photomultiplier 10, whereupon relay 65 is closed, allowing digital scanning of $x$ axis to continue by way of counter 72 and converter 78. The magnitude of the intensity could be read out with a conventional register, such as a Veedor-Root digital counter, connected to the seven-digit counter 72. However, in this instance, the digital count is utilized to halt the $x$ axis digital scan apparatus until the intensity counter level and the digital-to-analog converter 66 voltage exceeds the star voltage input to the comparator. At this point, a voltage is delivered to relay coil 71 which now closes relay 65, permitting digital counter 72 to continue sweeping the electron beam of the image photomultiplier 10 until the intensity counter level again exceeds the voltage output level from the image photomultiplier. Thus, this process is successively repeated until the output voltage of the image photomultiplier can no longer exceed the output from the intensity counter. This operation, therefore, halts the scan on the approximate maximum intensity position, or center, of the star image. At this point, after relay 65 has been opened and the $x$ axis sweep has been halted, simultaneously, current from amplifier 70, which was used to open relay 65, is also applied to a conventional thermal relay 76 adapted to open after a predetermined interval of continuous input time. Here the time interval is set for thirty milliseconds of continuous voltage which occurs at the flat top portion of the voltage waveform 77 entering comparator 68. The intensity counter is then halted and the coarse scan has completed. To apply the coarse scan to the photomultiplier 10, the $x$ axis digital counter is fed to the digital-to-analog converter 78, which, as noted, can be of the same type as digital-to-analog converter 66. An analog voltage output of the digital-to-analog converter 78 provides an $x$ axis stepped current, as shown at waveform 80, to step any possible star image through the aperture, as previously described. At the completion of a full-line scan, that is, a voltage on the $x$ axis which would scan any electrons emitted from the photocathode through the image, an additional output pulse from the $x$ axis counter 72 is fed to a $y$ axis, seven-digit counter 82 to drive the digital-to-analog converter 78. Staircase 80 has 128 horizontal steps for every step in the $y$ axis staircase 84, causing the beam to be deflected by one step in the $y$ axis. Thus, the $x$ axis beam is deflected by 128 steps per line, as counted in the $x$ axis counter, and then the $y$ axis counter is caused to change one pulse to move or deflect the beam one step in the $y$ axis direction to the subsequent line. The $y$ axis pulse on line 85 also is fed back to reverse the direction of the $x$ counter to provide a reverse stepping voltage to step sequentially in the opposite direction 128 steps prior to an additional pulse to the $y$ counter 82 and $y$ axis digital-to-analog converter 88. When the last line of the $y$ axis output from converter 88 is applied to the $y$ axis deflection coils, an output on line 89 is fed back to reverse the count of the $y$ counter, thus causing the beam to scan the face of the tube in the opposite sense. Of course, as sumes that no star has been detected and acquired during the coarse scan mode. When a star is detected, operation of the relay 65 stops the scan, and intensity counter 64, which has been biased not to count in the absence of a threshold from comparator 90, is energized when the voltage level out of the image photomultiplier 10 exceeds a preset star threshold level. This level is manually calibrated to a star catalog and set in by battery 92 and potentiometer 94. Thus, the selected threshold level will not be counted and, therefore, the sweep will not be stopped. When, however, the threshold level is exceeded, counting of the intensity commences. At the same time, it is to be noted that the level of the image photomultiplier exceeds the output of converter 66. Relay 65 then opens, as noted, and the scan stops and the intensity counter counts the number of voltage steps required to overcome the particular instantaneous star amplitude, thus recommencing the sweep and counting process until the peak value of the star is searched for thirty milliseconds, which by relay 62 discontinues the counting process. At this point, the particular $x$ and $y$ counters which scanned the peak position of the star image, are then read from $x$ register 67 and $y$ register 69 which record, respectively, the $x$ and $y$ voltages that are continuously stored during the time the scan is stopped. These $x$ and $y$ registers are conventional digital registers which store in binary form the $x$ and $y$ position of the star image with respect to the electrooptical axis of the detector device. Thus, the $x$ and $y$ position of the star image is determined with respect to the reference axis of the device. Since it takes approximately ten seconds to scan one frame, which is the entire field of view, the counters divide down the 1600 p.p.s. clock frequency to provide a scan rate of one hundred twenty-eight lines per approximately ten seconds, and one hundred twenty-eight steps per line, or 128 steps per .080 second.

When it is desired to develop greater accuracy between a star location and the reference axis of the image photomultiplier, the invention discloses that a fine scan can be developed by means of a precision analog sweep which is energized by a fine-scanning circuit 95, such as a single line scan, around the approximate star position. This is generated by a conventional sawtooth generator and set into operation by switch 96 which can be ganged to relay 62. A fifty-cycle filter circuit, not shown, for filtering the noise from the signal output of the image photomultiplier, is connected to the output of the image photomultiplier. The noise filter feeds a conventional peak detector, not shown, in the fine scan circuit 95 which detects and determines the location of the star image in the manner above described with respect to the coarse scan. The output of the fine scan circuit 95 is added in the form of an additional incremental position quantity of the $x$ register, thus obtaining more accurate position data with respect to the reference axis. If more than one star is in the field of view and position fix is to be obtained using two or more stars, both coarse and fine measurements in both the $x$ and $y$ directions may be combined to provide accurate determination of the location of said stars.

It should be understood that many modifications of the present invention can be made without departing from the scope of the invention. For example, the aperture in the image photomultiplier may not be centrally located along the reference axis, since the optical axis may be precalibrated and located with respect to a different physical axis of said tube. Similarly, the photomultiplier may be constructed with a plurality of apertures on the image plane and the location of each of these apertures with respect to the reference axis can be calibrated. The device would then be directed to within the field swept adjacent to a particular aperture, thus limiting the range of the sweep circuitry required to cover the total field of

What is claimed is:

1. In combination:
a radiant energy detecting device having a photoemissive surface to detect a plurality of radiant energy signals impinging thereon and an electrooptical reference axis;
means for electronically scanning said photoemissive surface to detect said radiant energy signals and provide an output signal;
means for biasing out of said output signal detected radiant energy signals below a predetermined threshold intensity;
and means for halting said scanning means in response to signals in excess of the predetermined threshold intensity.

2. The combination according to claim 1:
and means to measure the relative position of said radiant energy signals with respect to the electrooptical reference axis of said device.

3. In combination:
a radiant energy detecting device having a photoemissive surface and an electrooptical reference axis;
means for electronically scanning said photoemissive surface in discrete steps to detect radiant energy signals and provide an output;
means for repetitively halting and initiating said scanning means in response to radiant energy signals having a predetermined threshold value of intensity until the point of maximum intensity possessed by said energy signals is attained;
and means utilizing said output to measure the position of said radiant energy signals with respect to the electrooptical reference axis of said device.

4. In combination:
a radiant energy detecting device having a surface adapted to provide a beam of electrons in response to radiant energy impinging thereupon and an electrooptical reference axis;
means for electronically scanning said photoemissive surface in discrete steps and deflecting said beam of electrons through an aperture in said detecting device;
means for multiplying said beam of electrons deflected through said aperture to provide an output signal;
means for measuring the intensity of said output signal;
means for repetitively halting and initiating said scanning in response to an output signal of predetermined threshold intensity;
and means for measuring the angular distance of the particularly radiant energy providing said output signal with respect to the electrooptical reference axis of said device.

5. In combination:
a radiant energy detecting device having a surface adapted to provide a beam of electrons in response to radiant energy impinging thereupon and an electrooptical reference axis;
means for electronically scanning said photoemissive surface in discrete steps along two axes mutually perpendicular with respect to said reference axis and deflecting said beam of electrons through an aperture in said detecting device in axial alignment with said reference axis;
means for multiplying said aligned beam of electrons to provide an output signal;
means for measuring the intensity of said output signal;
means for halting said scanning in response to an output signal of predetermined threshold intensity along each of said axes;
means for successively and repetitively scanning said particular radiant energy to measure substantially the center line thereof;
and means for measuring the angular distance of said center line of said radiant energy with respect to the electrooptical reference axis of said device.

6. A stellar directional acquisition system including in combination:
a device for electronically recording the relative position of a plurality of radiant objects, said device having an electrooptical reference axis;
means electronically raster scanning said recorded position in discrete steps and generating output signals;
means for measuring the intensity of said output signals and comparing same to a predetermined threshold value of intensity to thereby halt said scanning upon attainment of a response of particular radiant objects;
and means for digitally measuring the angular position of said objects with respect to the electrooptical reference axis of said device.

7. A stellar directional acquisition system including in combination:
an electron discharge device containing a photocathode having a surface area capable of emitting electrons when illuminated by radiant objects and having an electrooptical reference axis;
means for electronically scanning said area in discrete steps along two axes mutually perpendicular with respect to said reference axis and deflect said emitted electrons through an aperture in said device in axial alignment with said reference axis to provide an output;
means in response to said output to measure the intensity of illumination of a portion of said area;
means for repetitively halting and initiating said scanning in response to a predetermined threshold value of intensity to determine substantially the center axis of predetermined radiant objects;
and direct readout digital means for measuring the angular distance of the center axis of said radiant objects and the reference axis of said device.

References Cited by the Examiner

UNITED STATES PATENTS

| | | | |
|---|---|---|---|
| 2,425,956 | 8/1947 | Salinger | 250—207 |
| 2,532,063 | 11/1950 | Herbst | 250—203 X |
| 2,906,916 | 9/1959 | Palmer | 250—203 X |
| 2,954,608 | 10/1960 | Lawlor | 250—203 X |
| 2,967,247 | 1/1961 | Turck | 250—203 |
| 3,080,485 | 3/1963 | Saxton | 250—203 |
| 3,120,578 | 2/1964 | Potter et al. | 250—203 |

References Cited by the Applicant

UNITED STATES PATENTS

| | | |
|---|---|---|
| 2,100,842 | 11/1937 | Farnsworth. |
| 2,287,298 | 6/1942 | Dillenburger. |
| 2,412,086 | 12/1946 | Hallmark. |

RALPH G. NILSON, *Primary Examiner.*

E. STRICKLAND, M. ABRAMSON,
*Assistant Examiners.*